Patented Nov. 17, 1931

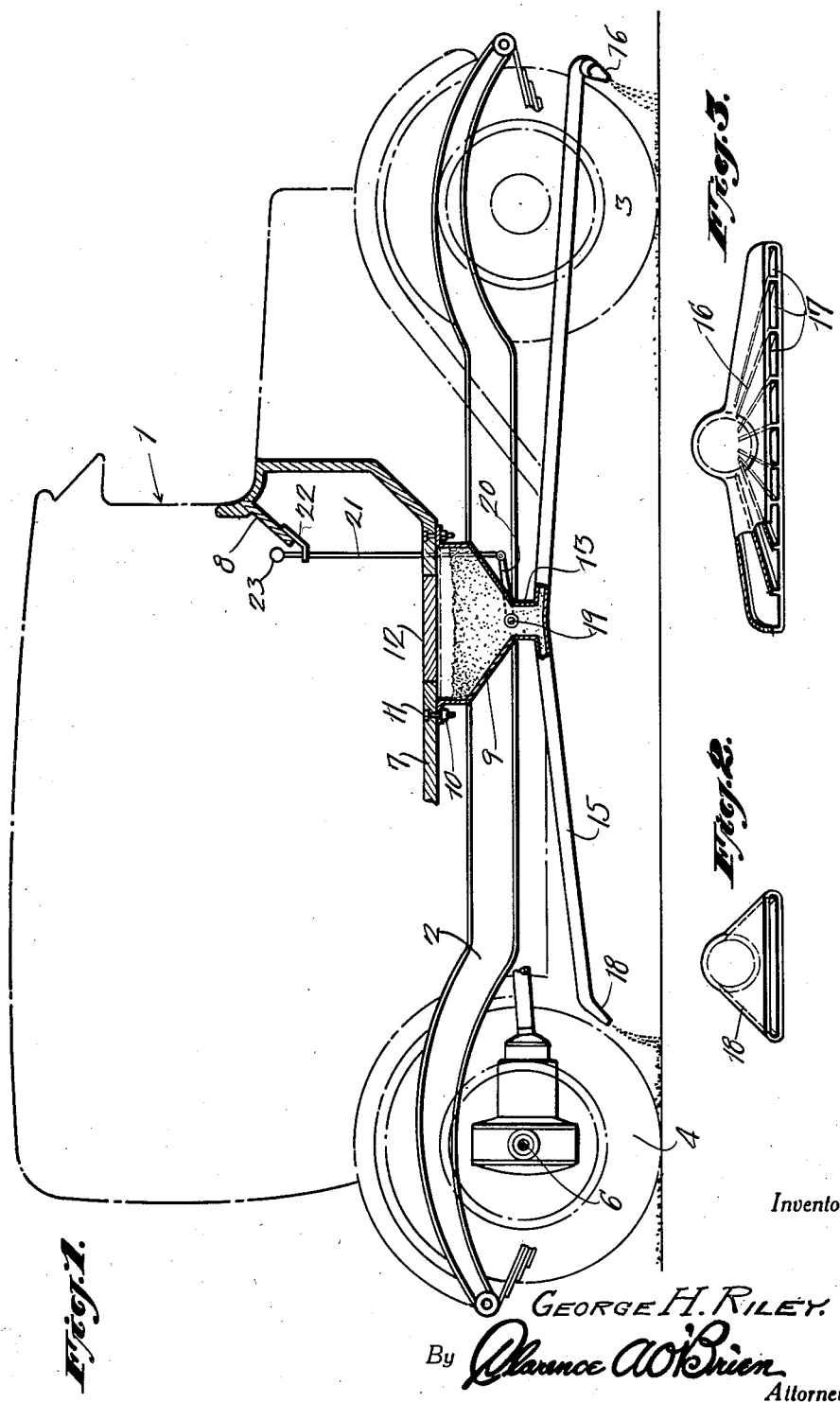

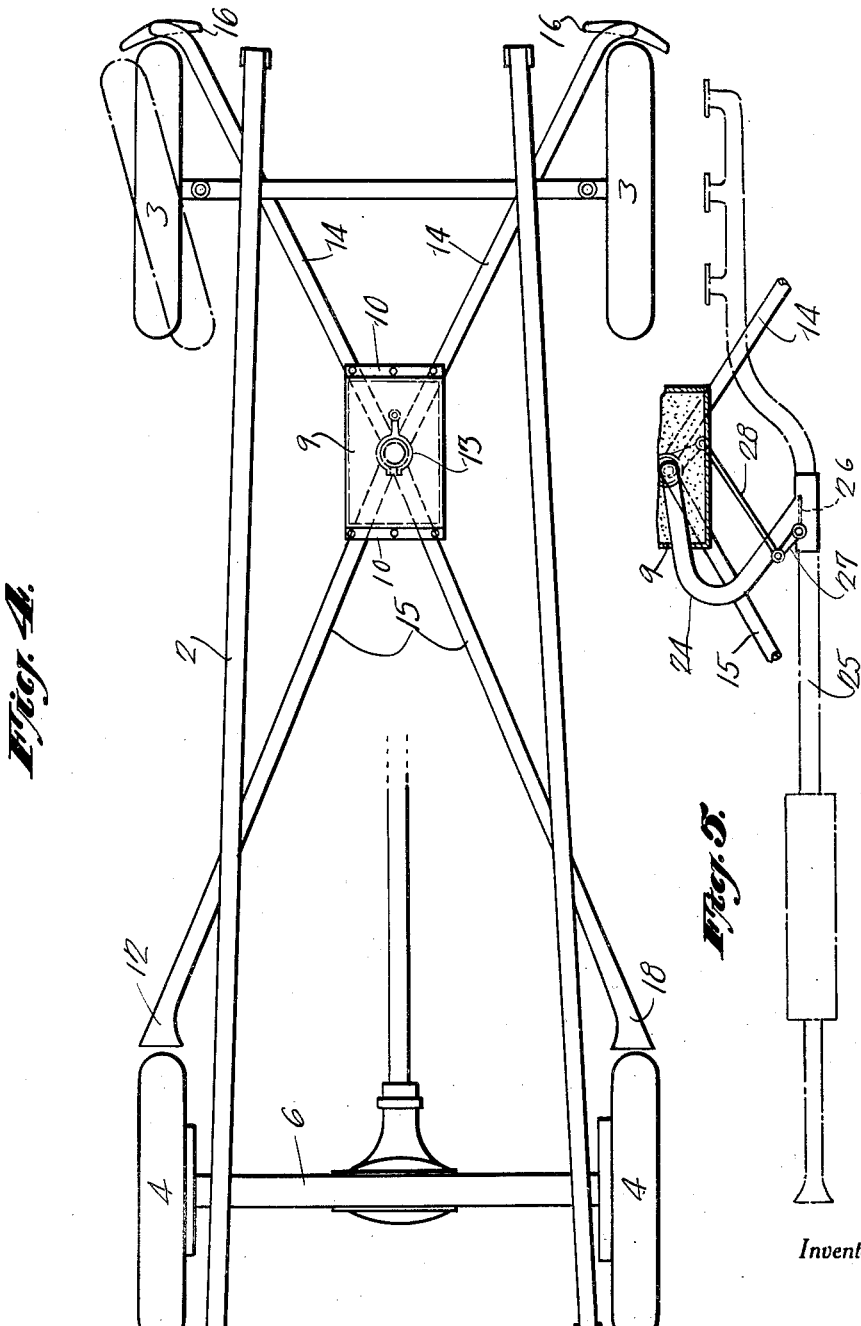

1,832,581

UNITED STATES PATENT OFFICE

GEORGE H. RILEY, OF DORCHESTER, MASSACHUSETTS

SANDING DEVICE FOR AUTOMOBILES

Application filed March 31, 1930, Serial No. 440,480. Renewed September 30, 1931.

This invention relates to a new and useful improvement in sanding devices for automobile and has for its primary object to provide, in a manner as hereinafter set forth, a sanding device of the aforementioned character which is adapted to be mounted on automobiles without the necessity of materially altering the same structurally and which will materially increase the traction of the wheels of the vehicle and reduce to a minimum the danger of skidding when traveling over slippery streets or roads.

Another important object of the invention is to provide a sanding device for automobiles of the character set forth which includes a manually operable valve for controlling the discharge of the sand and the invention aims further to provide distributing means for the sand which will deposit the same in a comparatively wide space beneath all four wheels of the vehicle.

Other objects of the invention are to provide a sanding device for automobiles of the character described which will be simple in construction, strong, durable, efficient in its use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a view partly in side elevation and partly in vertical longitudinal section of a sanding device constructed in accordance with this invention mounted in operative position on an automobile.

Figure 2 is a detail view in end elevation showing one of the distributing nozzles which is associated with the rear wheels of the vehicle.

Figure 3 is a detail view principally in end elevation and partly in section showing one of the distributing nozzles which is associated with the front wheels of the vehicle.

Figure 4 is a view in top plan showing the arrangement of the sanding device beneath the chassis of the vehicle.

Figure 5 is a view partly in section showing a slightly modified form of the invention.

Referring to the drawings in detail, it will be seen that the reference numeral 1 designates generally the vehicle which is of conventional construction and includes the chassis 2 mounted on the front wheels 3 and the rear wheels 4 through the medium of the axles 5 and 6. 7 designates the floor of the vehicle and 8 is the instrument board thereof.

The device comprising this invention includes a hopper 9 which is open at its top and dispensed from the floor 7 of the vehicle through the medium of the integral outturned flanged end and the bolts 11 An opening is provided in the floor board 7 which is closed by a removable cover 12 to permit access to be had to the hopper for the purpose of filling the same with sand.

An integral discharge neck 13 depends from the lowermost portion of the hopper 9 and communicates, at its lower end, with the radiating branch pipes 14 which extend forwardly of the front wheels 3 of the vehicle and with the branch pipes 15 which extend to the rear wheels of the vehicle. As best seen in Figures 1 and 4 of the drawings, the forwardly extending branch pipe 14 terminates in outwardly and downwardly curved end portions having mounted thereon the distributing discharge nozzle 16 having the passages 17 (see Figure 3) therein for depositing the sand in a comparatively wide path beneath the front wheels 3. The rearwardly extending branch pipes 15 have mounted on their free ends the downwardly directed distributing nozzle 18 adapted to deposit the sand in the path of the rear wheels 4.

A manually operable valve 19 is mounted for rotation in the upper end of the discharge neck 13 to control the flow of the sand therethrough from the hopper 9 and said valve has operatively connected thereto an arm 20 to the free end of which is pivotally connected an actuating rod 21 which extends upwardly through the floor 7 of the vehicle and is slidably supported through a bracket 22 which is secured to the lower side of the instrument board 8 and extends downwardly and rearwardly therefrom. A knob 23 is fixed on the upper end of the rod 21.

In use, when a slippery road is encountered, the operator grasps the knob 23 and actuates the rod 21 in a manner to open the valve 19. The sand will then flow by gravity through the neck 13 and the branch pipes 14 and 15 and be deposited in a wide path beneath the front and rear wheels of the vehicle through the distributing nozzles 16 and 18. In this manner the traction of the vehicle will be materially increased and the danger of skidding will be greatly diminished. The arrangement of the plurality of passages 17 in the front nozzles 16 assures the proper distribution of the sand from said nozzles.

In the modified form of the invention illustrated in Figure 5 of the drawings, a conduit 24 is connected to the exhaust manifold 25 of the automobile and communicates therewith through the pivoted valve 26. The opposite end of the conduit 24 extends into the hopper 9. The valve 26 has operatively connected thereto an arm 27 which, in turn is operatively coupled to the discharge valve 19 of the hopper 9 through the medium of the connecting link or rod 28. With this arrangement, when the valve 19 is opened, the valve 26 is automatically operated to diverge the exhaust gases from the manifold 25 through the conduit 24 and into the hopper 9 in a manner to assist in forcing the sand under pressure through the branch pipes 14 and 15 and the discharge nozzles 16 and 18. The exhaust gases will also effectively thaw the sand should the same become frozen in cold weather and clog in the lower end of the hopper, the neck 13 on the branch pipes 14 and 15.

It is believed that the many advantages of a sanding device for automobiles constructed in accordance with this invention will be readily understood, and although the preferred embodiment of the invention is as illustrated and described, it is to be understood that changes in the details of construction may be had which will fall within the scope of the invention as claimed.

What is claimed is:—

1. A sanding device for vehicles comprising, a sand hopper, a sand discharge pipe leading from said hopper to a point in advance of each of the wheels of said vehicle, and a sand discharge nozzle carried by each of said sand discharge pipes, the discharge nozzle of the discharge pipes leading to the front wheels of the vehicle being curved, and flaring to provide a relatively long narrow discharge opening longer than the width of the tread of the wheel.

2. A sanding device for vehicles comprising a sand hopper, a sand discharge pipe leading from said hopper to a place in advance of each of the wheels of said vehicle, and a sand discharge nozzle carried by each of said sand discharge pipes, the discharge nozzle of the discharge pipes leading to the front wheels of the vehicle being curved and formed with a plurality of discharge passages whereby the sand will be delivered over an area larger than the width of the tread of the wheel.

In testimony whereof I affix my signature.

GEORGE H. RILEY.